Dec. 8, 1942.     M. R. BUTLER     2,304,443
APPARATUS FOR HANDLING BULK MATERIALS
Filed March 20, 1940     4 Sheets-Sheet 1
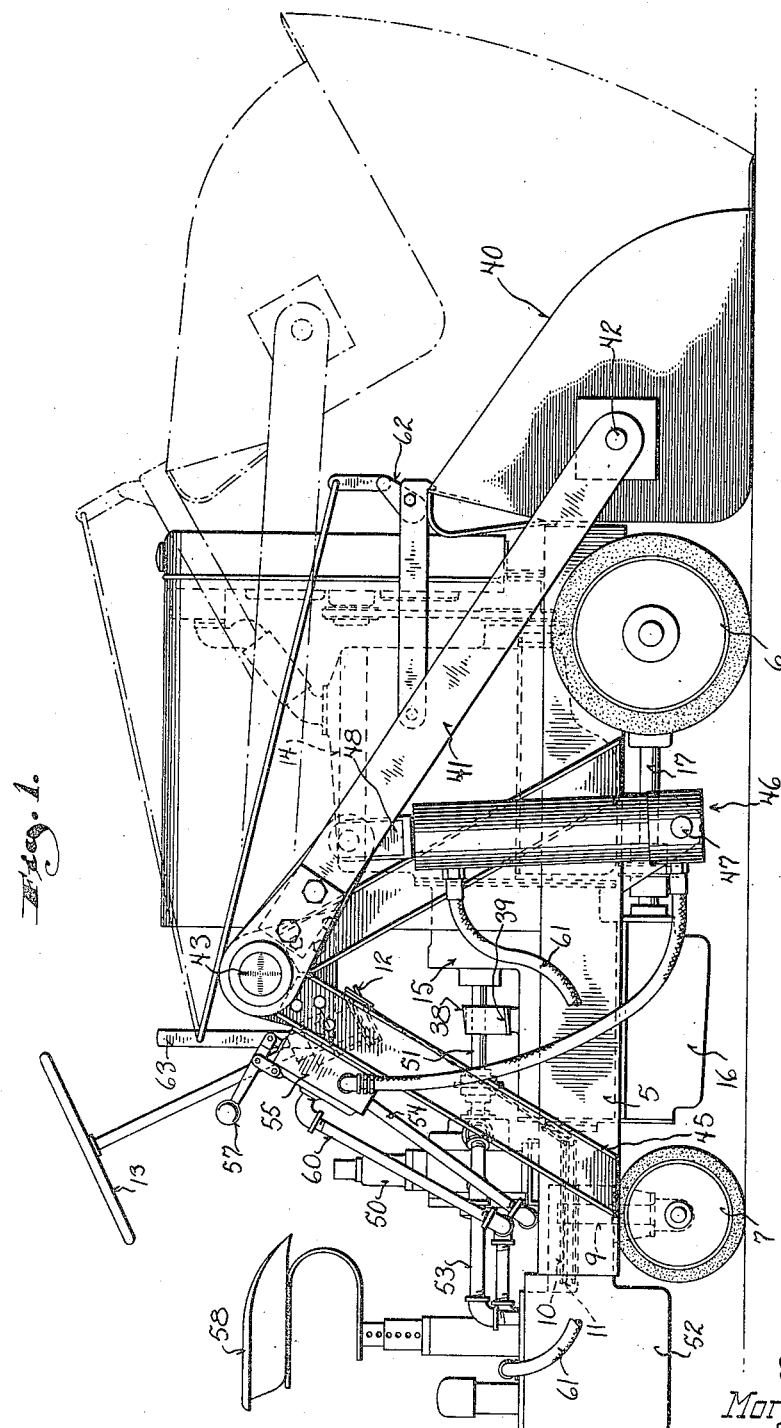
Inventor
Morgan R. Butler

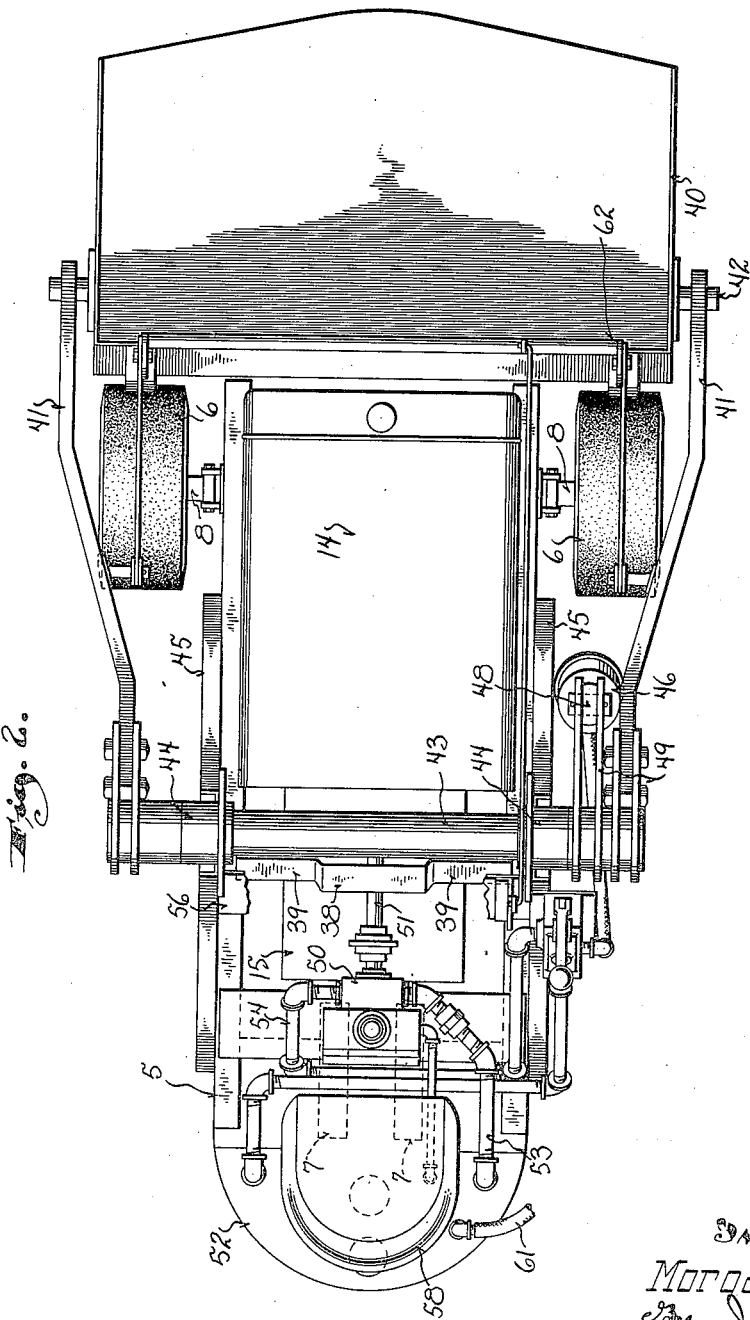

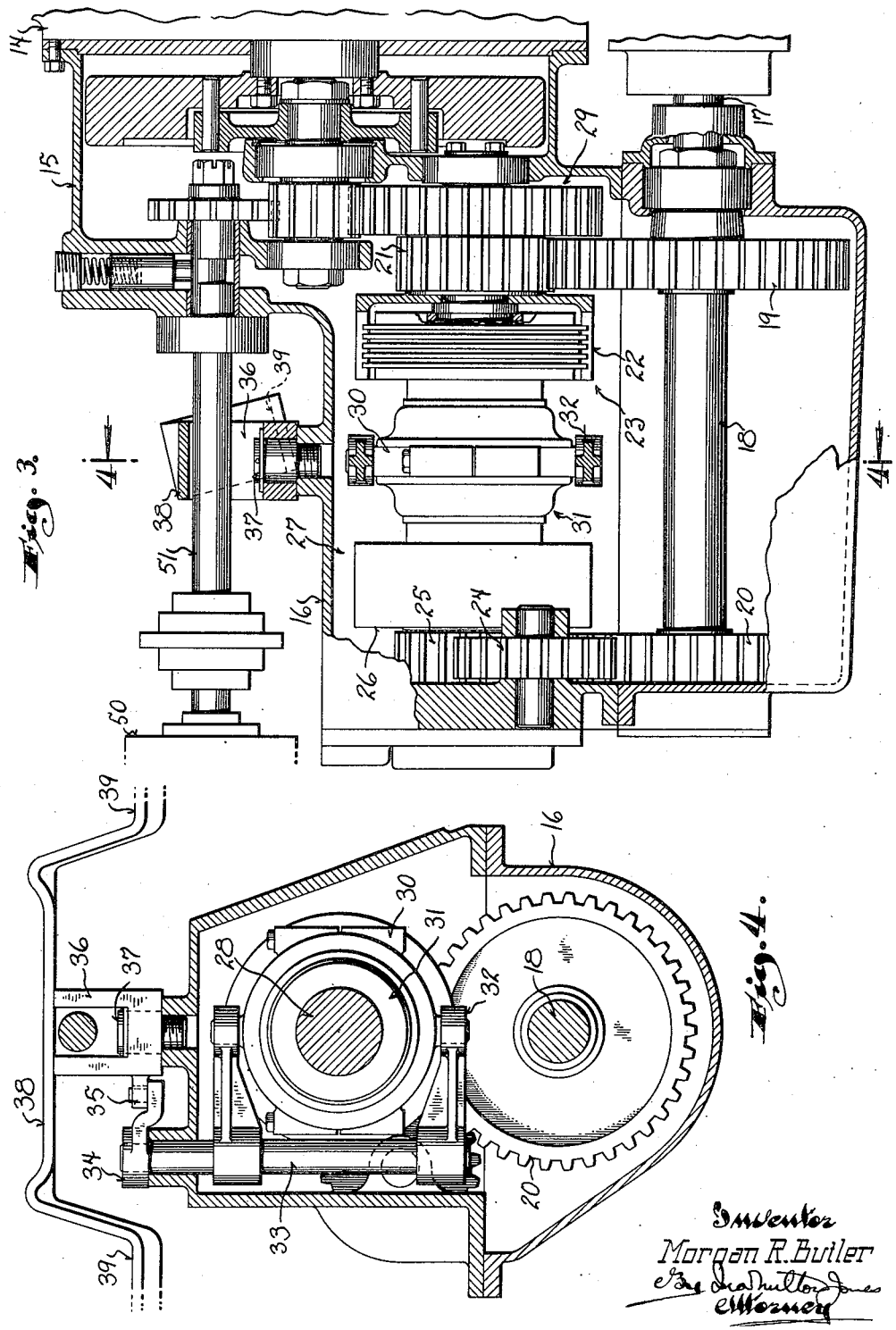

Dec. 8, 1942.   M. R. BUTLER   2,304,443
APPARATUS FOR HANDLING BULK MATERIALS
Filed March 20, 1940   4 Sheets-Sheet 4

Inventor
Morgan R. Butler
By [signature]
Attorney

Patented Dec. 8, 1942

2,304,443

UNITED STATES PATENT OFFICE 2,304,443

APPARATUS FOR HANDLING BULK MATERIALS

Morgan R. Butler, Waukesha, Wis., assignor to Butler Bin Company, Waukesha, Wis., a corporation of Wisconsin Application March 20, 1940, Serial No. 325,032

5 Claims. (Cl. 214—140)

This invention relates to apparatus for handling bulk materials, and refers particularly to equipment for unloading bulk cement from box cars.

When bulk cement is shipped by freight, it must be carried in closed cars. In some localities, covered gondola-type cars are available which, as is well known, are equipped with dumping bottoms so that the load can be discharged into a hopper beneath the track. However, the use of these gondola cars is restricted territorially so that most bulk shipments of cement must be made in box cars.

Unloading bulk cement from box cars presents an exceptionally difficult problem for by virtue of its finely pulverized state, it packs almost to solidity during transit. To illustrate how compact the mass becomes—a strong man has difficulty driving a shovel into the mass to a depth of two inches.

The various types of mechanical unloading equipment heretofore available were wholly unsatisfactory. Hence, manual labor had to be resorted to. The nearest approach to efficiency consisted in the provision of a hopper alongside the track siding into which the cement was shoveled by a gang of laborers and from which it was conveyed by screw or flight conveyors.

Besides the compactness of the bulk cement when it arrives at its destination, the restricted space available within a box car has been an obstacle to the development of any mechanical unloading device for supplanting manual labor.

The average width of a box car is nine feet; its doors are about six feet wide. To insure maximum usable space, the bulkheads are placed close to the edges of the doors, which means that the unfilled central portion of the car between the bulkheads generally is no larger than seven to nine feet by nine feet. Any mechanism employed, therefore, must be maneuverable in a comparatively small space. In addition, it must be capable of quickly reaching the remote corners or ends of the car.

Maneuverability within a restricted space and unlimited mobility thus are the primary requisites of any device designed for unloading bulk cement from box cars.

This invention provides a mechanical unloading device which meets these requirements.

More specifically, it is an object of this invention to provide a mechanical self-propelled scoop device capable of being maneuvered within the restricted confines of a box car and sufficiently powerful to cope with the compact cement to quickly and effectively scoop up relatively large quantities thereof and convey it out of the car to a receiving hopper.

Another object of this invention is to mount and operate the scoop in such a way that its digging or biting force is a component of the forward tractive force of the unit generally and the lifting force of the scoop.

Another object of this invention resides in the provision of a novel relationship between the power unit or engine, the transmission and the traction wheels by which a minimum overall length is made possible.

Still another object of this invention is to provide a mechanical unloading device which is very easily and rapidly maneuverable within a small space by an operator riding the device and which is so constructed that it may pick up a load from the floor or at an elevation above the floor, carry it to a receiving point, and dump it into a relatively high receiving hopper.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side view of a power scoop constructed in accordance with this invention;

Figure 2 is a top plan view thereof;

Figure 3 is an enlarged vertical sectional view through the transmission of the device;

Figure 4 is a cross sectional view taken through Figure 3 on the plane of the line 4—4;

Figure 5:
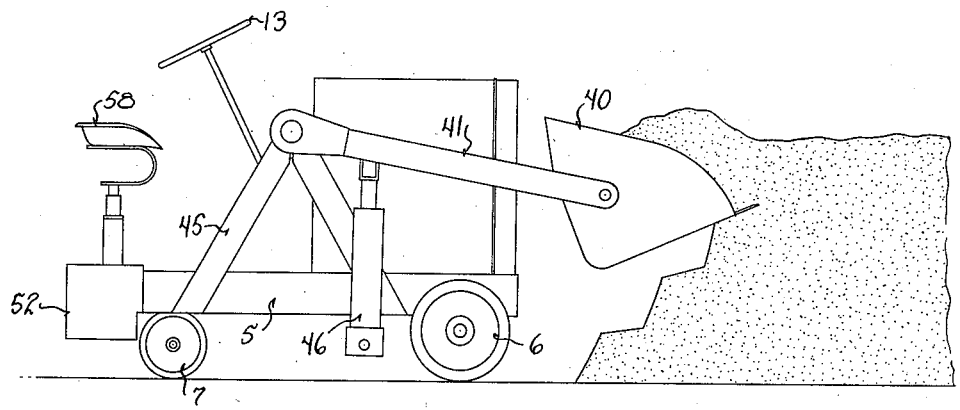
Figure 5 is a diagrammatic view illustrating the manner in which the device operates.
Figure 6:
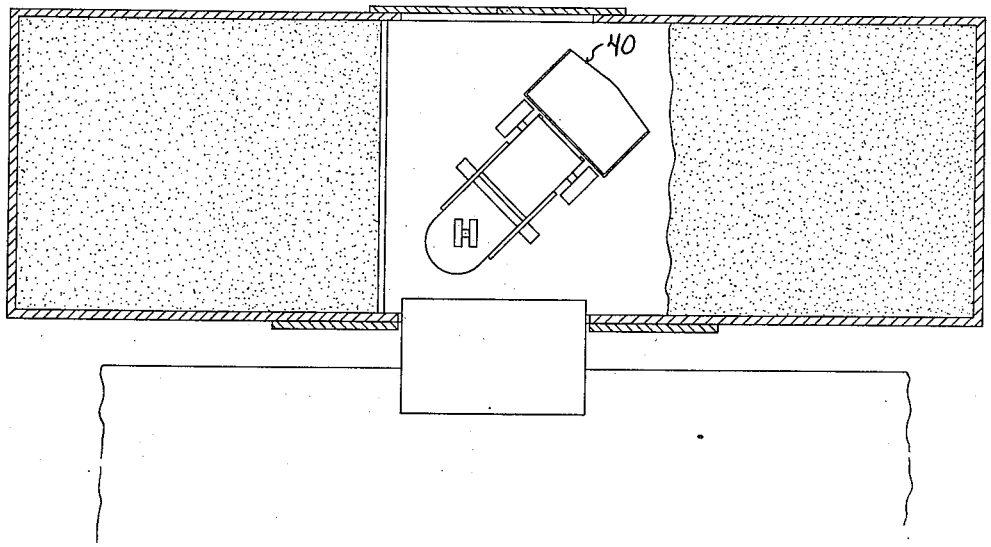
Figure 6 is a diagrammatic horizontal sectional view through a box car illustrating how easily the device may be maneuvered within a box car.

Referring now particularly to the accompanying drawings, in which like numerals indicate like parts, the numeral 5 designates the chassis of the self-propelled mechanical unloading device or power scoop. The front end of the chassis is supported by traction wheels 6 mounted on axles 8 which extend from a suitable differential (not shown). The rear end of the chassis is supported by steering wheels 7 close enough together to be considered a single wheel. A vertical swivel post 9 mounts the steering wheels from the chassis.

The steering gear may be of any suitable construction; and in the present instance consists of a pulley 10 fixed to the swivel post and a cable 11 wound thereabout and around a spool 12 fixed to the column of a steering wheel 13.

The front end of the chassis carries a power unit 14 preferably in the form of an internal combustion engine. At its rear, the power unit or engine connects with a transmission, indicated generally by the numeral 15. A housing 16 secured to the rear of the engine and adequately supported from the chassis with the lower end thereof depending therefrom, encloses the transmission.

Projecting forwardly from the lower front end of the transmission and under the engine is a power take-off or drive shaft 17 which connects the transmission with the differential of the traction wheels. Arranging the power unit, transmission, and the driving connection between the transmission and differential in this manner conserves considerable space and enables the overall length of the device to be held to a minimum.

The drive shaft 17 is coupled to a jack shaft 18 journalled in the transmission and provided with gears 19 and 20 at its front and rear ends, respectively, these gears being fixed to the shaft.

The gear 19 meshes with a drive pinion 21 which is fixed to the driven element 22 of a forward clutch, indicated generally by the numeral 23; while the gear 20 is drivingly connected through an idler pinion 24 with a pinion 25 fixed to the driven element 26 of a reverse clutch 27.

The driving elements of the clutches are fixed to a power shaft 28 upon which the pinions 21 and 25 are loosely journalled and which is drivingly connected with the crankshaft of the engine through gearing 29.

The clutches 23 and 27 are of the multiple disc type adapted to operate in a bath of oil and are selectively and alternately engageable to effect either forward or reverse propulsion of the device.

The means for engaging the clutches comprises a spanner ring 30 surrounding a hub 31 common to the driving elements of both clutches and a shifter fork 32 operatively connected with the spanner ring. The shaft 33 of the shifter fork is suitably journalled in the housing of the transmission and protrudes from the top wall of the transmission housing.

Fixed to the upper end of the shaft 33 is a lever 34; and connected with this lever is an actuating lever 35 extending from the side of a pivoted cross bar support 36. This support is pivoted to the central portion of the transmission housing on a stud 37 and has a cross bar 38 fixed thereto, the ends of which provide foot rests 39.

Hence, as will be readily apparent, by rocking the cross bar 38 in one direction, the forward clutch is engaged to effect forward propulsion of the device; and by rocking the bar in the opposite direction, the reverse clutch is engaged to effect reverse propulsion of the device.

Extending across the front end of the device is a scoop 40. This scoop is mounted between the outer ends of two arms 41 to which it is pivotally connected by trunnions 42. The arms 41 extend rearwardly alongside the power unit and are fixed to a transverse shaft 43 journalled in suitable bearings 44 mounted on the apexes of rigid A frames 45 which extend up from the side rails of the chassis.

The axis of the pivotal support for the arms is thus positioned substantially medially of the length of the device and at a substantial distance above the chassis. This manner of mounting the scoop not only effects maximum compactness but what is more important—provides exceptionally effective digging action.

When the scoop is in its lowered position, it is directly adjacent to the front traction wheels on a plane substantially beneath the axis of the pivotal support for its arms. Consequently, as the arms are elevated to raise the scoop, the scoop swings upwardly and outwardly. The digging or biting force is thus a component of the tractive force tending to move the entire device forwardly and the lifting force applied to the scoop supporting arms.

In practice, as illustrated in Figure 5, the operator drives the device forwardly to dig the scoop into the mass as far as possible, and then begins to raise the scoop at the same time holding the unit against backing by the application of the necessary forward traction. This action is repeated several times so that the "bites" are taken in steps.

Attention is also directed to the fact that the manner employed for mounting the scoop shortens the turning moment tending to tip the device about the axis of its traction wheels to a minimum when the load is greatest; for at this time, the scoop is directly adjacent to the front wheels.

The lifting of the scoop is effected by means of a fluid pressure motor or hydraulic jack, indicated generally by the numeral 46, the cylinder of which is pivotally supported from the chassis, as at 47; while the piston rod 48 is connected to a lever 49 fixed to the shaft 43.

Fluid pressure is derived from a pump 50 mounted on the chassis substantially above the rear steering wheels 7. This pump is driven from the power unit or engine by means of a shaft 51 extending rearwardly across the top of the transmission, the cross bar support 36 being bifurcated to accommodate this shaft.

A fluid reservoir 52 is mounted on the rear end of the chassis to provide the necessary supply of fluid for operation of the motor 46, and by virtue of its location serves as a counterbalance for the weight of the loaded scoop.

The inlet of the pump is connected with the fluid supply reservoir by a pipe line 53 and its outlet is connected through a pipe line 54 with a control valve 55.

The control valve is mounted on a cross bar 56 joining the upper ends of the rear legs of the A frames so that its operating lever 57 is readily accessible to an operator seated on the seat 58.

The control valve is of conventional design and is adapted upon proper manipulation of its control lever 57, to connect the lower end of the cylinder of the fluid pressure motor with the pressure source through a duct 59.

A by-pass line 60 connects the control valve with the reservoir, as is customary; and to limit the projection of the piston of the fluid pressure motor, the upper end of its cylinder is also connected with the reservoir through a duct 61.

The pivotal connection of the scoop to its supporting arms 41 is so located that unless restrained, the scoop overbalances to its discharging position. To releasably restrain the scoop against such tipping, a latch 62 is provided. This latch engages over the upper edge of the scoop and is released by pulling on a hand lever 63 mounted on the cross bar 56 conveniently accessible to the operator.

As will be readily apparent the structure relationship defined effects an exceedingly compact and short machine which may be readily maneuvered within the restricted confines of a box car, and which by virtue of its exceptional power, may be quickly loaded to capacity and run out of the car to deposit the load in any suitable hopper or receptacle.

From the foregoing description taken in connection with the accompanying drawings, it will be readily apparent that this invention provides a practical manner of handling bulk cement and other similar bulk materials and that it is particularly adapted for the unloading of the bulk cement from box cars.

What I claim as my invention is:

1. A machine for handling bulk materials in a restricted space comprising: a wheeled chassis, the wheelbase of which is substantially short, the front of said chassis extending substantially no further forward than the forward periphery of the front wheels; a power unit mounted on the chassis at the front end thereof over the front wheels and including a transmission extending a short distance rearwardly from the power unit toward the rear of the chassis; a drive connection extending forwardly from the transmission to the front wheels; a scoop; a supporting arm structure forming a boom one end of which is secured to the scoop, said boom having a length substantially no greater than the dimension of the wheel base of the machine; means pivotally mounting the opposite end of the boom for swinging movement about an elevated axis substantially above the power plant, the location of said pivot axis for the boom being so related with respect to the length of the boom that the back of the scoop is directly adjacent to the forward periphery of the front wheels in the lowered position of the boom, said location producing a substantial forward arcuate motion of the scoop during elevation of the boom; and means for swinging the boom to raise and lower the scoop.

2. A machine for handling bulk materials in a restricted space comprising: a wheeled chassis, the wheelbase of which is substantially short, said chassis extending substantially no further forward than the forward periphery of the front wheels; a power unit mounted on the chassis at the front end thereof over the front wheels and including a transmission extending a short distance rearwardly of the front wheels; a scoop; a supporting arm structure forming a boom one end of which is secured to the scoop, said boom having a length substantially no greater than the dimension of the wheel base of the machine; means pivotally mounting the opposite end of the boom for swinging movement about an elevated axis substantially above the power plant adjacent to its rear end, the location of said pivot axis for the boom being so related with respect to the length of the boom that the back of the scoop is directly adjacent to the forward periphery of the front wheels in the lowered position of the boom, said location producing a substantial forward arcuate motion of the scoop during elevation of the boom; and mechanism driven from the power unit for raising the scoop including a hydraulic jack supported from the chassis at a point behind one front wheel below the chassis and connected with the boom between its pivot axis and its connection with the scoop.

3. In a machine for handling bulk materials in a restricted space: a wheeled vehicle having traction wheels at the front thereof, said vehicle including a chassis supported on the wheels of the vehicle with its front end extending substantially no further forward than the forward periphery of the traction wheels, and a scoop mounted in front of the chassis; a compact power unit for propelling the vehicle and operating the scoop, said power unit being mounted at the forward end of the chassis in a position adjacent to the front end of the vehicle so that a portion thereof overlies the traction wheels, and including a transmission extending rearwardly from the power unit; a drive connection extending forwardly from the transmission to the traction wheels; and means mounting the rear wheels of the vehicle under the rear of the chassis for rotation on an axis lying directly behind the transmission so as to hold the wheel base of the vehicle to a minimum dimension and thereby permit operation of the machine in a restricted space.

4. In a device of the character described: a vehicle including a chassis having traction wheels at its forward end and a scoop mounted directly in front of the chassis; a compact power unit for propelling the vehicle and operating the scoop, said power unit being mounted at the forward end of the chassis so that a portion thereof overlies the traction wheels and including a transmission extending rearwardly of the power unit; a drive connection extending forwardly from the transmission to the traction wheels; a wheel immediately to the rear of the transmission for supporting the rear end of the chassis; means mounting said rear wheel for swinging movement about a substantially vertical axis; and means for adjusting the position of the rear wheel on said substantially vertical axis to thereby afford control for the direction of travel of the vehicle.

5. A machine for handling bulk materials in a restricted space comprising: a wheeled chassis, the wheelbase of which is substantially short, the front of said chassis extending substantially no further forward than the forward periphery of the front wheels; a power unit mounted on the chassis at the front end thereof over the front wheels and including a transmission extending a short distance rearwardly of the front wheels; a drive connection in superimposed relationship with the power unit for drivingly connecting the front wheels with the transmission; a scoop; a supporting arm structure forming a boom one end of which is secured to the scoop; means pivotally mounting the opposite end of the boom for swinging movement about an elevated axis substantially above the power plant and so located with respect to the length of the boom that the back of the scoop is directly adjacent to the forward periphery of the front wheels in the lowered position of the boom, said location producing a substantial forward arcuate motion of the scoop during elevation of the boom; and mechanism driven from the power unit for raising the scoop including a hydraulic jack supported on the chassis for swinging movement on a horizontal axis at an elevation no greater than the front wheels of the machine, said hydraulic jack being connected with the boom between its pivot axis and its connection with the scoop.

MORGAN R. BUTLER.

CERTIFICATE OF CORRECTION.

Patent No. 2,304,443.  December 8, 1942.

MORGAN R. BUTLER.

It is hereby certified that error appears in the printed specification of the above numbered patent requiring correction as follows: Page 3, first column, line 54, claim 2, for "the front wheels in the lowered position of the" read --the front end thereof over the front wheels and--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.